United States Patent [19]

Weissensteiner

[11] Patent Number: 4,566,045

[45] Date of Patent: Jan. 21, 1986

[54] SYSTEM FOR THE REPRODUCTION OF SIGNALS STORED ON A MAGNETIC TAPE

[75] Inventor: Walter Weissensteiner, Vienna, Austria

[73] Assignee: U.S. Philips Corporation, New York, N.Y.

[21] Appl. No.: 621,414

[22] Filed: Jun. 18, 1984

[30] Foreign Application Priority Data

Jun. 17, 1983 [AT] Austria .................. 2243/83

[51] Int. Cl.$^4$ .............................................. G11B 5/56
[52] U.S. Cl. .................................................. 360/77
[58] Field of Search ................................. 360/77, 78

[56] References Cited

U.S. PATENT DOCUMENTS

| 4,148,082 | 4/1979 | Okada et al. | 360/77 |
| 4,148,083 | 4/1979 | Watanabe | 360/77 |
| 4,167,763 | 9/1979 | Kubota | 360/77 |
| 4,255,768 | 3/1981 | Kubota | 360/10 |
| 4,303,953 | 12/1981 | Sanderson | 360/78 |
| 4,402,022 | 8/1983 | Hirota et al. | 360/77 |
| 4,462,049 | 7/1984 | Heitmann | 360/10.2 |
| 4,528,605 | 7/1985 | Hiraguri | 360/77 |

Primary Examiner—George G. Stellar
Attorney, Agent, or Firm—Robert T. Mayer

[57] ABSTRACT

A system for the reproduction of signals stored in diagonal tracks (S1,S2,S3,S4,S5,S6,S7, . . . ) on a magnetic tape (1) incorporates a drum-shaped scanning device (2) with at least two magnetic heads (K1,K2), each mounted on an electro-mechanical adjusting device (A1,A2), of which magnetic heads only one is in scanning contact with the magnetic tape during first scanning intervals (T1) while during second scanning intervals (T2) both are in scanning contact with the magnetic tape (1), which is partly wound round the scanning device (2). For generation of the adjustment signals to be applied to the adjusting devices (A1,A2) for the purpose of guiding the magnetic heads (K1,K2) along the tracks-signals containing a measurement of the deviations of the magnetic heads from the track—an adjustment-signal generating circuit (14) is provided, to which the signals reproduced by the two magnetic heads simultaneously in scanning contact are taken in time-division multiplex form during the second scanning interval (T2), signals generated in the adjustment-signal generating circuit (14) and corresponding to the adjustment signals for the two adjustment devices (A1-,A2) of these magnetic heads being taken on a TDM basis via a second switching device (40) controlled in a similar manner to the first switching device (29) to storage circuits (36,37) connected at the inputs to these adjustment devices (FIG. 4).

2 Claims, 6 Drawing Figures

SYSTEM FOR THE REPRODUCTION OF SIGNALS STORED ON A MAGNETIC TAPE

The invention relates to a system for the reproduction of signals stored on parallel tracks adjacent to one another and running diagonally to the longitudinal axis of the magnetic tape on which they are stored, with a drum-shaped scanning device round whose outer surface the magnetic tape is wound spirally within a predetermined angular range and which, for the purpose of scanning the tracks successively and reproducing the signals stored on them, comprises at least two magnetic heads which can be driven with a rotary movement, of which only one is at any time in scanning contact with the magnetic tape in cyclically successive first scanning intervals and both of which are simultaneously in scanning contact with the magnetic tape in cyclically successive second scanning intervals located between the first scanning intervals and which are mounted on electromechanical adjustment devices with which, for their guidance over the tracks to be scanned, the magnetic heads are adjustable transversely in relation to the tracks as a function of the adjustment signals applied to the adjustment devices, for the generation of which adjustment signals an adjustment-signal generating circuit is provided, to which circuit, via a first switching device controlled by a control-signal generator, the signals reproduced by the magnetic heads and containing a measurement of the deviations of the magnetic heads from the tracks can be applied alternately for the purpose of generating signals corresponding to the adjustment signals for the adjustment devices and which circuit incorporates the storage circuits connected at the inputs to the adjustment devices, to which storage circuits, via a second switching device controlled by the control signal generator in a similar manner to the first switching device, the signals corresponding to the adjustment signals can be led alternately and which keep these signals for generation of the adjustment signals stored, the control-signal generator activating the first switching device in the first scanning intervals so as to pass the signals reproduced by the particular head in scanning contact on to the adjustment-signal generating circuit and activates to the second switching device so as to pass the signals corresponding to the adjustment signals for the adjustment device carrying the particular magnetic head in scanning contact on to the storage circuit connected at the input to this adjustment device. A system of this kind is known, for example, from DE-OS No. 32 17 031.

In the first scanning intervals in the known system, in which system only one of the two magnetic heads of the drum-shaped scanning device is in scanning contact with the magnetic tape at any given time, adjustment signals generated from the reproduced signal containing a measurement of the deviations of the particular magnetic head from the track are applied to the adjustment device carrying the particular magnetic head in scanning contact for precise guidance of the particular magnetic head in scanning contact along the tracks to be scanned by it, so that during each first scanning interval precise track guidance is ensured for the magnetic head concerned. In the second scanning intervals, in which both magnetic heads are simultaneously in scanning contact with the magnetic tape, only adjustment signals for the adjustment device of one magnetic head are generated from the signals reproduced by the latter and containing a measurement of the deviations of this magnetic head from the track and applied to that adjustment device for the precise guidance of this magnetic head along the tracks to be scanned by it, whereas an adjustment signal generated from the signal reproduced by the second magnetic head during the first scanning interval and then stored is applied to the adjustment device for the second magnetic head. While it is true that one magnetic head can be precisely guided in this way along the tracks to be scanned by it, also during the second scanning intervals, precise track guidance of the other magnetic head is not guaranteed in the second scanning intervals because the adjustment signal for the adjustment device of this magnetic head is kept during every second scanning interval at the previous value generated and stored in the first scanning interval and, consequently, changes in the tracking of the tracks to be scanned by the other magnetic head during the second scanning interval, which are reflected in the reproduced signals, remain unaccounted for. This means that deviations of the other magnetic head from the track can occur in the second scanning intervals and this results in poorer reproduction of the stored signals.

In order to guide two magnetic heads precisely at all times along the tracks to be scanned by them, it is possible to allocate a separate adjustment-signal generating circuit to each adjustment device of these two magnetic heads. The two adjustment-signal generation circuits can, completely independently of one another, each generate, from the signals reproduced by the magnetic head mounted on the allocated adjustment device and containing a measurement for the deviations of this magnetic head from its track, adjustment signals for the allocated adjustment device. The provision of two such adjustment-signal generation circuits, however, represents a considerable additional expense and, moreover, also involves an adaptation of the two adjustment-signal generation circuits to each other in order to ensure for both an identical behaviour as is necessary for flawless operation.

The invention has been set the task of ensuring, in a system of the kind described in the preamble, the precise guidance, also during the second scanning intervals, of two magnetic heads simultaneously in scanning contact with the magnetic tape, in such a way as to pass, at least once on an alternating time-division multiplex basis, the signals reproduced by the two magnetic heads in simultaneous scanning contact with the tape on to the adjustment-signal generating circuit, and the signals corresponding to the adjustment signals for the adjustment devices carrying the two magnetic heads in simultaneous scanning contact on to the storage circuits connected at the inputs to these adjustment devices. This ensures that, practically without additional means as compared to the known system, adjustment signals are generated in multiplex form, also in the second scanning intervals, for the adjustment devices of the two magnetic heads simultaneously in scanning contact with the tape, from the signals reproduced simultaneously by the magnetic heads and taken to the two adjustment devices of these two magnetic heads. This therefore ensures that the magnetic heads are guided precisely along the tracks to be scanned by them both in the first and also in the second scanning intervals, so that flawless reproduction of the signals stored in the tracks on the magnetic tape always results.

The known state of the art offers various possibilities for the design of the switching devices. For example, the switching devices can be formed by simple change-over switches. The switching devices may also consist of separate make-contact switches whose output contacts are connected in the first switching device and whose input contacts are connected with each other in the second switching device. With regard to the embodiment of a second switching device it has proved advantageous in the system according to the invention for the second switching device activated by the control-signal generator to be formed by signal-scanning switches of scanning and hold circuits containing the storage circuits connected at the inputs to the adjustment devices. The signal-scanning switches provided in any case in scanning and hold circuits are thus used simultaneously to form the second switching device, so that a simple circuit structure is obtained.

The invention will now be further explained with the aid of an example of embodiment shown in the drawings, to which, however, the invention cannot be restricted.

Figure 1:
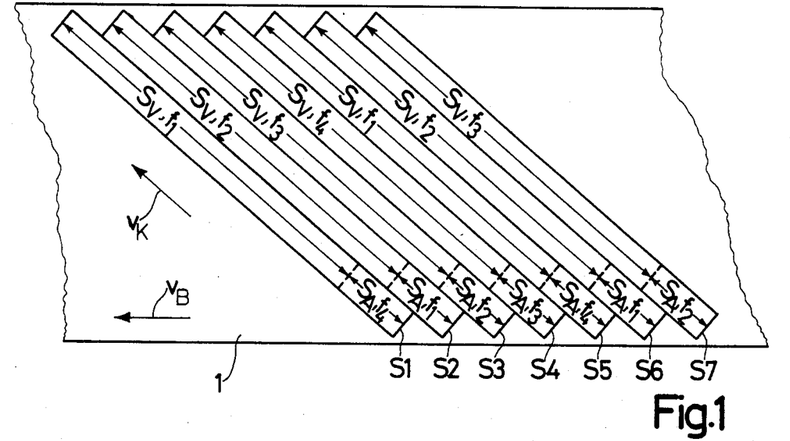
FIG. 1 shows schematically a magnetic tape with a pattern of tracks running diagonally in relation to it.

FIG. 1 shows a section of a magnetic tape 1 on which signals are stored in parallel, adjacent tracks S1, S2, S3, S4, S5, S6, S7 etc. running diagonally in relation to the longitudinal axis of the tape. When the signals were recorded in these tracks, the magnetic tape 1 was moved in the direction of arrow $v_B$ with constant speed and the magnetic heads for recording of the signals were driven in the direction of the arrow $v_K$ at constant speed. In the present case audio signals $S_A$ are recorded in a first section of each track in time-compressed, pulse-code modulated form and video signals $S_V$ are recorded in a second section of each track adjacent to the first section of the track in frequency-modulated or frequency-transposed form. Together with the audio signals and the video signals four longwave track-following signals are alternately recorded in the tracks, the frequencies of which, $f_1$, $f_2$, $f_3$ and $f_4$, change from track to track in a predetermined pattern. As indicated schematically in FIG. 1, the same track-following signal is recorded together with the video signal in the second section of each track and with the audio signal in the first section of the particular succeeding track.

Figure 2:
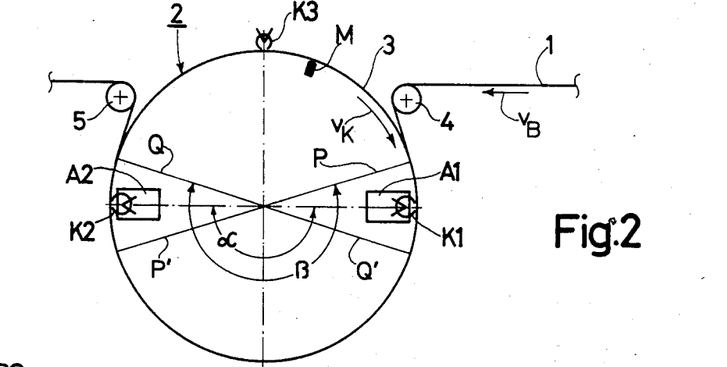
FIG. 2 shows, also schematically, a drum-shaped scanning device for the reproduction of signals stored in the tracks of the magnetic tape shown in FIG. 1, which device incorporates two magnetic heads which can be driven in rotatory motion and are arranged diametrically opposite each other, are each mounted on an electromechanical adjustment device, and are used for the reproduction of the signals.

For the reproduction of the signals stored in tracks $S_1$, $S_2$, etc. on magnetic tape 1, the systems provided for the purpose incorporates in a generally known fashion a drum-shaped scanning device 2, as shown schematically in FIG. 2. A scanning device 2 of this kind may, for example, consist of a stationary drum-half and a drum-half which can be driven in a rotary direction coaxial to the former, on which hals two magnetic heads K1 and K2 are arranged at an angular distance $\alpha$ of 180° apart, i.e. diametrically opposite each other. The two magnetic heads K1 and K2 make scanning contact through a gap arranged between the two drums-halves with magnetic tape 1, scanning the tracks successively so as to reproduce the signals stored in them. For this purpose magnetic tape 1 is wound around the outer surface 3 of the scanning device 2 formed by the two drum-halves, in a spiral path within a winding-angle range $\beta$, which is greater than the angular distance $\alpha$ between the two magnetic heads K1 and K2, the magnetic tape being guided by two tape guides 4 and 5 in the area of the scanning device 2 in order to achieve the winding-angle range $\beta$. For the reproduction of the signals stored in the tracks the magnetic tape is moved, for example, in the direction of arrow $v_B$ and the magnetic heads K1 and K2 driven in rotary fashion in the direction of arrow $v_K$. In order to be able to detect the relative position of magnetic heads K1 and K2 in relation to magnetic tape 1 or tracks S1, S2, S3, etc., a position transmitter is provided which consists essentially of a magnet M fitted to the drum half which can be driven in a rotary direction and of a magnetic head K3 which is fixed in relation to the scanning device and which, because of the positioning of magnet M on the drum-half which can be driven in a rotary direction, always delivers a pulse when the rotating magnetic head K1 makes an effective contact with magnetic tape 1. The two magnetic heads K1 and K2 are each mounted on an electromechanical adjusting device A1 or A2, which, for example, in a likewise generally known fashion, may be formed by bimorph, piezo-electric, strip-shaped bending elements, known as piezo-actuators. With these adjustment devices it is possible to displace the magnetic heads transversely in their position relative to the tracks so as to guide them along the tracks to be scanned by them.

Figure 3:
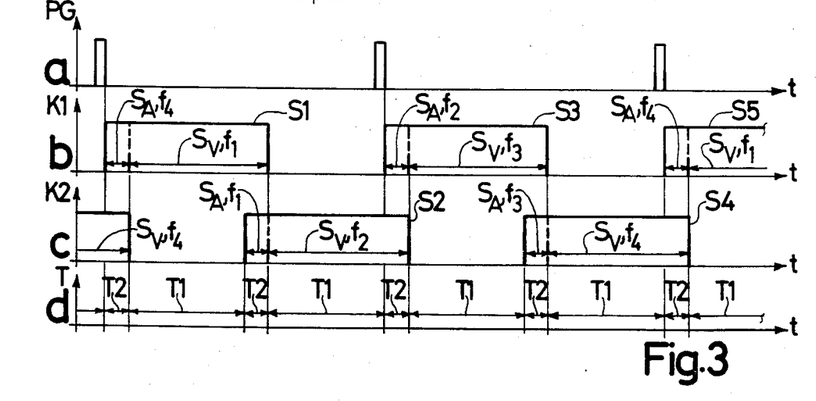
FIG. 3, consisting of a–d, shows some signal-time diagrams from which the scanning conditions for the magnetic heads as a function of time can be recognised.

The scanning conditions for the two magnetic heads K1 and K2 will now be explained briefly with the aid of FIG. 2 and the diagrams shown in FIG. 3. FIG. 3a shows the pulse-type output signal PG from the position transmitter formed by the magnet M and the stationary magnetic head K3. As already stated, the position transmitter emits a pulse every time the magnetic head K1 comes in working contact with magnetic tape 1. To that end the position transmitter is designed so that upon the appearance of the trailing edge of the pulses from the position transmitter the magnetic head K1 always starts scanning the track which it has to track, as can be seen from FIGS. 3a and 3b. FIGS. 3b and 3c show the successive time intervals in which magnetic heads K1 and K2 reproduce the signals stored in the tracks. In the present case it is assumed that magnetic head K1 scans tracks S1, S3, S5 etc. successively and magnetic head K2 tracks S2, S4, etc. successively, the two magnetic heads reproducing the audio signals $S_A$, video signals $S_V$ and the track-following signals with the frequencies $f_1$, $f_2$, $f_3$ and $f_4$ stored in these tracks, as shown in FIGS. 3b and 3c. As follows from FIG. 2 and also FIGS. 3b and 3c, when at the start of scanning of a track by a magnetic head K1 or K2 the latter is located on a radius marked P in FIG. 2, the other magnetic head K2 or K1 is still engaged in scanning the preceding track, this magnetic head being located on the radius marked p' in FIG. 2. Only after the magnetic heads have rotated on in the direction of the arrow $v_K$ through an angular range equal to the difference between the winding-angle range $\beta$ and the angular distance $\alpha$ does the other magnetic head K2 or K1 lose scanning contact with the magnetic tape, the latter being located on the radius marked Q in FIG. 2 and the diametrically opposite magnetic head being correspondingly located on the radius marked Q' in FIG. 2. Thus, in the present system, the scanning arrangements are such that, of the two magnetic heads K1 and K2, only one magnetic head K1 or K2 is in scanning contact with the magnetic tape 1 in cyclically successive first scanning intervals T1 and, in cyclically successive second scanning intervals T2 located between the first scanning intervals T1, both magnetic heads K1 and K2 are simultaneously in scanning contact with the magnetic tape. The cyclical succession of the first and second scanning intervals is indicated in FIG. 3d.

Figure 4:
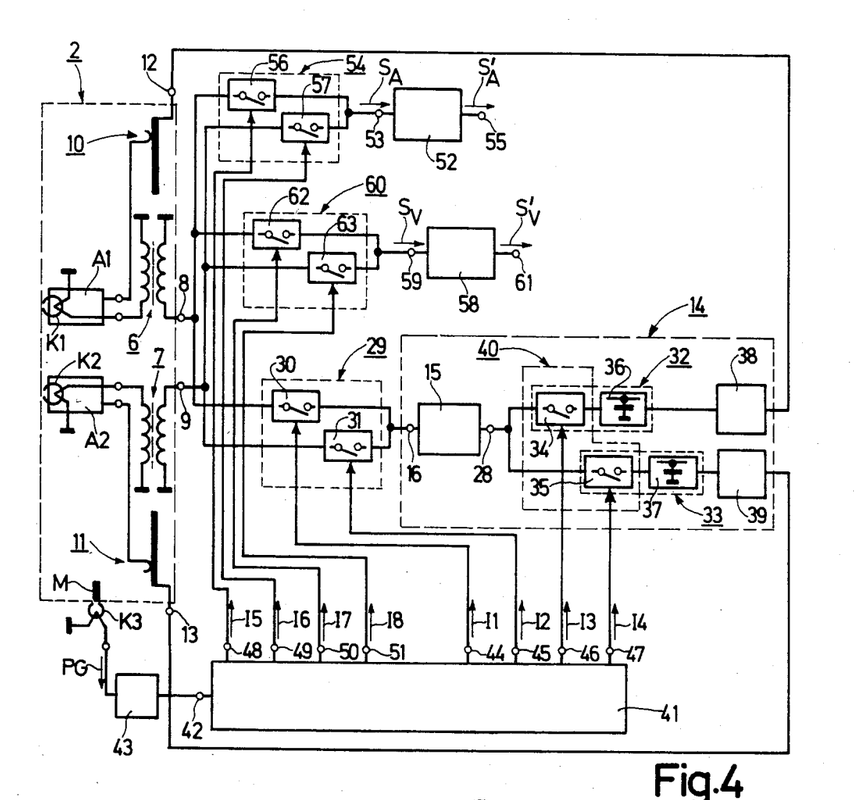
FIG. 4 is a schematic diagram of the parts essential to the invention, of the electrical configuration of a system according to the invention for reproducing signals stored in the tracks of the magnetic tape shown in FIG. 1.

From this point on, the description will be made with reference to FIGS. 4 and 5. In FIG. 4 the scanning device 2 is indicated schematically by a rectangle formed by broken lines. For the transmission of signals reproduced by the magnetic heads K1 and K2, which are driven with a rotary movement, from the rotary drum-half to the stationary drum-half of the scanning device, a winding of a rotating transformer 6 (7), at whose output 8 (9) the reproduced signals are available for further processing, is connected to magnetic head K1 (K2). As already stated, magnetic head K1 (K2) is mounted on an electromechanical adjustment A1 (A2), to which the adjustment signals necessary for its deflection can be led via a slip-ring arrangement 10 (11) provided between the stationary drum-half and the rotating drum-half of the scanning device. The adjustment signals are led to the slip-ring arrangements via an input connection 12 (13). For the generation of the adjustment signals for the adjustment devices A1 and A2, in order to guide the magnetic heads K1 and K2 precisely along the tracks to be scanned by them, the system shown schematically in FIG. 4 for the reproduction of the signals stored in the tracks incorporates an adjustment-signal generation circuit 14 comprising a circuit section 15 which generates from the signals reproduced by the magnetic heads K1 and K2 and containing a measurement of the deviation of the magnetic heads from the tracks, which signals are available at the output connections 8 and 9 of the rotating transformers 6 and 7, signals corresponding to the adjustment signal for the adjustment devices A1 and A2.

Figure 5:
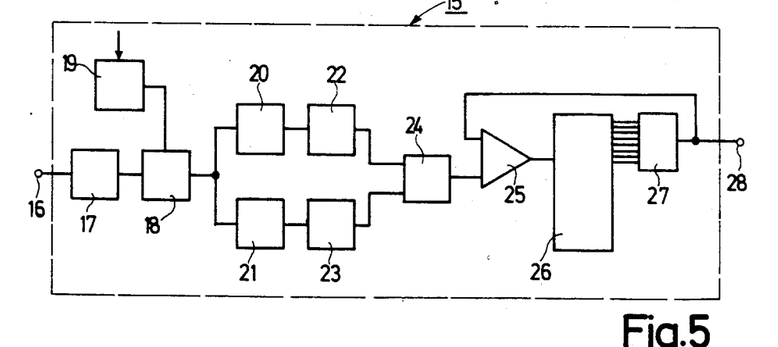
FIG. 5 shows in detailed form a part of the electrical configuration shown in FIG. 4.

The circuit section 15 which is shown in greater detail in FIG. 5, will now be briefly further explained. It should, however, be pointed out that the design of this circuit part is known as such and is not essential to the invention, so that de description which follows will be confined to the most essential points. For an exhaustive explanation of this circuit design readers may be referred to, for example, DE-OS No. 28 09 402, DE-OS No. 29 50 607 and DE-OS No. 30 07 874.

The signals reproduced by the magnetic heads K1 and K2 are taken to the input 16 of section 15 of the adjustment-signal generation circuit 14. Connected at the input 16 is a bandpass filter 17 which filters the track-following signals from the composite signal reproduced by the magnetic heads. It should be mentioned at this point that during the scanning of a track by a magnetic head, it is not only the track-following signal recorded in this track together with the relevant audio signal and video signal, but also the track-following signal cross-talk received from the two adjacent tracks, which signals are a measurement of deviations of the magnetic head from the track to be scanned by it, that are scanned and reproduced. The reproduced track-following signals which are filtered out by bandpass filter 17 are taken to a mixer circuit 18, to which mixed signals with varying frequency are additionally applied by a variable mixed-signal generator 19. The variable mixed-signal generator 19 always delivers as its mixed signal a signal with a frequency which coincides with the frequency of the track-following signal, which is recorded in the tracks scanned at any given moment by the magnetic heads. On the basis of the pattern shown in FIG. 1, with which the track-following signals are recorded in the tracks alternately, both magnetic heads, during the second scanning intervals in which both magnetic heads are in scanning contact with the magnetic tape and consequently reproduce signals, cover sections of track in which the same (as to frequency) track-following signal is stored. Connected to the mixer circuit 18 are two bandpass filters 20 and 21 each of which is tuned to the mixed-frequency product resulting from the mixed signal and one of the track-following signals subjected to cross-talk. An amplitude detector 22 (23) is connected to each band-pass filter (20,21) in order to determine the amplitudes of the mixed-frequency products. These amplitudes are compared in a comparison circuit 24 connected to amplitude detectors 22 and 23. The output signal from the comparison circuit 24, which represents a measurement of the size and direction of the deviations of the scanning paths of the magnetic heads in relation to the tracks to be actually scanned by them, is taken to a comparator 25, to another input of which a tracking-error signal representing the deviations of the scanning paths of the magnetic heads from the tracks to be scanned by them, converted into an analogue signal by a digital-analogue converter 27, and stored in digital form in a storage device 26 formed by a microprocessor, is also applied. Depending on the result of the comparison in comparator 25 the tracking-error signal stored in the storage device is corrected so that it represents a measurement of the deviations of the scanning magnetic heads from the track at any given moment. Thus, a tracking-error signal corresponding to the adjustment signals for the precise guidance of the magnetic heads along the tracks to be scanned by them is stored in the storage device 26, which signal, after conversion by the digital-analogue converter 27, is available at output 28 of circuit section 15 for the formation of the adjustment signals.

For the alternate application of the signals reproduced by the magnetic heads K1 and K2 to the adjustment-signal generating circuit 14 and to input 16 of circuit section 15 of the latter, a first controllable switching device 29 is provided which consists of two switches 30 and 31. Switch 30 is connected at its input with the output connection 8 of the rotary transformer 6 of magnetic head K1 and switch 31 is connected at its input with the output connection 9 of the rotating transformer 7. The outputs of switches 30 and 31 are connected to each other and to output 16 of the circuit section 15. Two scanning and hold circuits 32 and 33 connected to each other with their inputs are connected to the output 28 of circuit section 15, each of which circuits has a signal-scanning switch 34 (35) and each a storage circuit 36 (37) connected at the output of the signal-scanning switch. The storage circuit 36 (37) is connected via a circuit stage 38 (39), for the purpose of signal conversion and amplification, to the input connection 12 (13) of the slip-ring arrangement 10 (11) and hence to the adjustment device A1 (A2). The two signal-scanning switches 34 and 35 together form a second controllable switching device 40 via which the signals delivered by circuit section 15 at its output 28 and corresponding to the adjustment signals for the adjustment devices, which signals are formed by the output signals from the digital-analogue converter 27, are applied alternately to storage circuits 36 and 37, which keep these signals stored for generation of the adjustment signals with circuit stages 38 and 39. By using the signal-scanning switches 34 and 35, which are incorporated in any case in the scanning and hold circuits 32 and 33, to form the second switching device, it becomes unnecessary to design this second switching device with separate switches, so that, in addition to the saving, a particularly simple circuit design results.

For the control of the first and second switching devices 29 and 40, a control-signal generator is provided, to whose input 42 the pulse-type position-transmitter signal from the position transmitter formed by the magnet M and the stationary magnetic head K3, which signal is led via a signal-forming and amplifying circuit 43, is applied in order to trigger it. The control-signal generator 41 has control outputs 44, 45, 46, 47, 48, 49, 50 and 51, at which it delivers pulse-type control signals as will be explained below. A control-signal generator of this kind can, for example, be very simply formed by a microprocessor, in which case the storage device 26 of the adjustment-signal generating circuit 14 and the control-signal generator 41 can effectively be embodied in a single microprocessor. In the present context the 8051 microprocessor of Intel has proved effective in practice. The generation of pulse-type control signals with the aid of such a microprocessor is achieved by the generally known method of time-controlled raising or lowering of the potentials of outputs. For that reason, and also for the sake of simplicity, it has been decided not to provide a separate flow diagram for the generation of a pulse-type control signal with the aid of a microprocessor.

Figure 6:
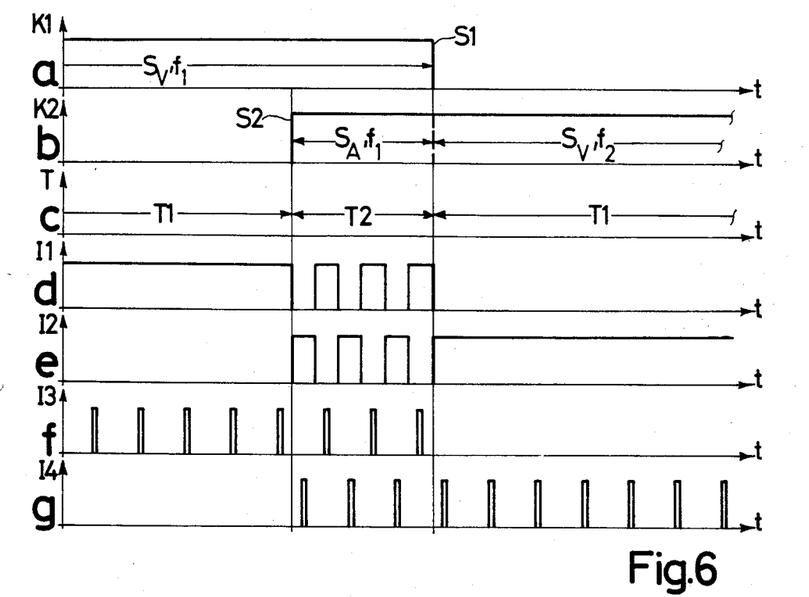
FIG. 6, consisting of a–g, shows some signal-time diagrams with reference to which the function of the electrical configuration off the system shown in FIG. 4 will be explained.

The control of the first and second switching devices 29 and 40 of the control-signal generator 41 will now be described with reference to the diagrams in FIG. 6. As in FIGS. 3b and 3c, but only on a sectional basis with an expanded time scale, the time intervals in which the magnetic heads K1 and K2 reproduce the signals stored respectively in tracks S1 and S2 are represented in FIGS. 6a and 6b. Like FIG. 3d, FIG. 6c shows the first and second scanning intervals T1 and T2, starting with the end section of the first scanning interval T1, in which only magnetic head K1 is in scanning contact with the magnetic tape and reproduces the video signal $S_V$ and the track-following signal with the frequency $f_1$ from track S1, then showing the second scanning interval T2, in which both magnetic heads K1 and K2 are in scanning contact with the magnetic tape and magnetic head K1 reproduces the video signal $S_V$ and the track-following signal with the frequency $f_1$ from track S1 while simultaneously magnetic head K2 reproduces the audio signal $S_A$ and also the track-following signal with the frequency $f_1$ from track S2, and after that the next first scanning interval T1, in which only magnetic head K2 is in scanning contact with the magnetic tape and reproduces the video signal $S_V$ and the track-following signal with the frequency $f_2$ from the track S2, in that chronological order. In the second scanning interval T2 the magnetic heads K1 and K2 reproduce the same track-following signal from both the scanned tracks S1 and S2, the same track-following signals with cross-talk also being reproduced by both magnetic heads, as can easily be checked with reference to the track pattern in FIG. 1.

FIG. 6d shows the pulse-type control signal I1 emitted by the control-signal generator 41 at its control output 44, which signal is taken to switch 30 of the first switching device 29 in order to control it. In FIG. 6e the pulse-type control signal I2 emitted by control-signal generator 41 at its control output 45 is shown, which signal is taken to switch 31 of the first switching device 29 in order to control it. FIG. 6f shows the pulse-type control signal I3 emitted by the control-signal generator 41 at its control output 46, which signal consists of short-duration scanning pulses occuring at a predetermined rate and which is taken to the signal-scanning switch 34 of the second switching device 40. FIG. 6g shows the pulse-type control signal I4 emitted by the control-signal generator 41 at its control output 47, which signal likewise consists of short-duration scanning pulses occuring at a predetermined rate and which is applied to the signal-scanning switch 35 of the second switching device 40. In this process the control of switches 30, 31, 34 and 35 is effected in such a way that they are made conductive, i.e. closed, by a control pulse applied to them. These switches, of course, are simply formed by electronic switches, e.g. transistor switching stages. With the pulse-type control signals I1, I2, I3 and I4 the control-signal generator 41 in the first scanning intervals T1 activates the first switching device 29 so as to pass on the signals reproduced by magnetic head K1 or K2, whichever is in scanning contact with the magnetic tape, on to the adjustment-signal generating circuit 14, and the second switching device 40 so as to pass the signals emitted by the circuit section 15 and corresponding to the adjustment signals for the adjustment device A1 or A2 carrying the particular magnetic head K1 or K2 in scanning contact with the magnetic head A1 or A2 on to the storage circuit 36 or 37 of the scanning and hold circuit 32 or 33 connected at the input to the adjustment device A1 or A2.

The control signal I1 effects in the first scanning interval T1, in which only the magnetic head K1 is in scanning contact with the magnetic tape, a continuous closure of switch 30 of the first switching device 29, so that the signal reproduced by the magnetic head K1 is passed on without interruption to the adjustment-signal generating circuit 14 and, accordingly, the control signal I3 effects in the relevant first scanning interval T1 a closure of the signal-scanning switch 34 of the second switching device 40 at the rate of the scanning pulses of the control signal I3, so that the signal derived in circuit section 15 from the signals reproduced by magnetic head K1 and applied to adjustment-signal generating circuit 14 via switch 30 of the first switching device 29 and corresponding to the adjustment signal for the adjustment device A1 carrying the magnetic head K1 is scanned at the rate determined by the control signal I3 with regard to its amplitude each of the scanned signal values being stored in the storage circuit 36 until the arrival of the next signal value. From the signal values successively stored in the storage circuit 36 at the rate of the scanning pulses, the adjustment signal for the adjustment device A1 of the magnetic head K1 in scanning contact with the magnetic tape is formed by further processing and amplification in the circuit stage 38 for signal conversion and amplification, so that head K1 is guided precisely along the track to be scanned by it in the relevant first scanning interval. In the following first scanning interval T1, in which only the magnetic head K2 is in scanning contact with the magnetic tape, the control signal I2 causes continuous closure of switch 31 of the first switching device 29, so that the signal reproduced by magnetic head K2 is passed on uninterruptedly to the adjustment-signal generating circuit 14, and the control signal I4 accordingly causes the closure in the relevant first scanning interval T1, at the rate of the scanning pulses of the control signal I4, of the signal-scanning switch 35 of the second switching device 40, so that the signal corresponding to the adjustment signal for the adjustment device A2 carrying magnetic head K2 and derived in circuit section 15 from the signals reproduced by magnetic head K2 and applied to the adjustment-signal generating circuit 14 via switch 31 of the first switching device 29, is scanned with regard to its amplitude at the rate determined by the control signal 14, each of the scanned signal values being stored in the storage circuit 35 until the arrival of the next signal value. From the signal value successively stored in storage circuit 37 at the rate of the scanning pulses the adjustment signal for the adjustment device A2 of the magnetic head K2 in scanning contact with the magnetic tape is formed by further processing and amplification in the circuit stage 39 for signal conversion and amplification, so that magnetic head K2 is also guided precisely along the track to be scanned by it in the relevant first scanning interval. This arrangement ensures that the magnetic heads are always guided precisely along the tracks to be scanned by them in the first scanning intervals, so that flawless reproduction of the stored signals is always ensured.

As can be seen from FIGS. 6d, 6e, 6f and 6g, the pulse-type control signals I1, I2, I3 and I4 emitted by the control-signal generator 41 each comprise three pulses in the second scanning intervals T2. At the same time the three pulses of control signals I2 and I2 and those of control signals I3 and I4 are so shifted in their phase position relative to each other that in the second scanning intervals, in which both magnetic heads K1 and K2 are in scanning contact with the magnetic tape, the control-signal generator 41 activates the first and second switching devices 29 and 40 to pass three times, on an alternating time-division multiplex bases, the signal reproduced by the two magnetic heads K1 and K2 simultaneously in scanning contact with the magnetic tape on to the adjustment-signal generating circuit I4 and the signals corresponding to the adjustment signals for the adjustment devices A1 and A2 carrying the magnetic heads K1 and K2, which are both simultaneously in scanning contact, on to the storage circuits 36 and 37 connected at the inputs to these adjustment devices A1 and A2.

At the beginning of the second scanning interval T2 the first pulse of control signal I2 occuring in this scanning interval causes a closure of the switch of the first switching device 29 and the first scanning pulse of control signal I4 occuring in the second scanning interval accordingly causes a brief closure of signal-scanning switch 35 of the second switching device 40, so that, at the beginning of the second scanning interval T2 the signals reproduced by magnetic head K2 are applied to the adjustment-signal generating circuit 14 for the duration of the first pulse of the switching signal I2, and from the signal extracted from it in circuit section 15 and corresponding to the adjustment signal for the adjustment device carrying magnetic head K2, a signal value is scanned and stored in storage circuit 37. From the signal value stored in storage circuit 37 an adjustment-signal value is then derived for the adjustment device A2 in the circuit stage 39 and applied to A2. After receipt of this adjustment-signal value for the adjustment device A2 the control-signal generator 41, by means of the first pulse of control signal I1 occuring in the second scanning interval and the first pulse of control signal I3 occuring in the second scanning interval, drives the signal-scanning switch 34 of the second switching device 40 into the conducting state, whereupon, in similar fashion, a signal value is stored in the storage circuit 36 and in circuit stage 38 and adjustment-signal value is derived for the adjustment device A1 and applied to it. After receipt of this adjustment-signal value for the adjustment device A1 a further similar changeover of the first and second switching devices occurs, which is effected by the second pulses of switching signals I2 and I4 occuring in the second scanning intervals, so that an adjustment signal value for the adjustment device A2 is again derived. This alternating changeover of the first and second switching devices in order to pass, on a time-multiplex basis, the signals reproduced by the magnetic heads on to the adjustment-signal generating circuit and the signals derived from them and corresponding to the adjustment signals on to the storage circuits, is repeated a total of three times, and adjustment-signal value for the particular adjustment device being generated on the basis of each change-over process. Three adjustment-signal values are thus generated in the second scanning interval T2 for each adjustment device A1 and A2. It would, of course, also be conceivable to generate more than three adjustment-signal values for each adjustment device in the second scanning interval. It should also be mentioned at this point that in the second scanning intervals which chronologically follow those first scanning intervals in which only the second magnetic head is in scanning contact with the magnetic tape, first an adjustment-signal value for the adjustment device A1 carrying the first magnetic head is generated by corresponding activation of the first and second switching devices and then, in a manner similar to that described above, adjustment-signal valves are generated in time-division multiplex form for both adjustment devices alternately by the corresponding, alternating change-over of the two switching devices. It should also be mentioned that in the second scanning intervals the leading edges of the scanning pulses of control signals I3 and I4 for activating the signal-scanning switches 34 and 35 of the second switching device occur with a delay in relation to the leading edges of the corresponding pulses of control signals I1 and I2 for activating switches 30 and 31 of the first switching device 29, in order to compensate for the signal delay times caused in circuit section 15.

The chronologically alternating generation of the adjustment-signal values for the two adjustment devices in the second scanning intervals ensures that it is possible, with advantage, to make do with only a single circuit section 15 for generating the signals corresponding to the adjustment signals from the signals reproduced by the magnetic heads and that, at the same time, the two magnetic heads are always guided precisely along the tracks to be scanned by them in the second scanning intervals, too, so that, in this case as well, flawless reproduction of the stored signal is guaranteed.

As already mentioned, the audio signals $S_A$ are stored in time-compressed, pulse-code modulated form in a first section of each track and the video signals $S_V$ in frequency-modulated or frequency-transposed form in a second section of every track adjoining the first track section. The system shown in FIG. 4 for reproducing the signals stored in the tracks incorporates, for comparison of the time-compressed and pulse-code modulated audio signals $S_A$ reproduced by the magnetic heads K1 and K2 into audio signals $A_S'$, which are suitable for reproduction with a loudspeaker, an audio-signal processing circuit 52, to whose input 53 the reproduced audio signals $S_A$ can be applied via a third switching device 54, also controllable by the control-signal generator 41, and which delivers the converted audio signals $S_A'$ at its output. The third switching device 54 has two switches 56 and 57. The input of switch 56 is connected to the output connection 8 of the rotary transformer 6 of magnetic head K1 and the input of switch 57 to the output connection 9 of the rotary transformer 7 of magnetic head K2. The outputs of both switches 56 and 57 are connected to one another and to the input 53 of the audio-signal processing circuit 52. Switch 56 is controlled by a pulse-type control signal I5 emitted by control-signal generator 41 at its control output 48, the control signal I5 ensuring that switch 56 is always conducting when the magnetic head K1 reproduces an audio signal $S_A$ from the relevant sections of the tracks. Switch 57 is controlled by a control signal I6 emitted by the control-signal generator 41 at its control output 49, control signal I6 ensuring that switch 56 is always conducting when the magnetic head K2 reproduces an audio signal $S_A$ from the relevant sections of the tracks. The audio-signal processing circuit filters the reproduced audio signal $S_A$ from the signal mixture of audio signals $S_A$ and track-following signals with the frequencies $f_1$, $f_2$, $f_3$ and $f_4$ applied to it via the third switching device and converts them by means of appropriate decoding and time expansion into audio signals $S_A'$ which can be reproduced with a loudspeaker.

In order to be able to convert the frequency-modulated or frequency-converted video signals $S_V$ reproduced by the magnetic heads K1 and K2 into video signals $S_V'$ which can be reproduced with a television receiver, the system shown in FIG. 4 incorporates a video-signal processing circuit 58, to whose input 59 the signals reproduced by the magnetic heads K1 and K2 can be led via a fourth switching device 60 which can likewise be controlled by the control-signal generator 41 and which delivers at its output 61 the converted video signals $S_V'$. The fourth switching device 60 has two switches 62 and 63. The input of switch 62 is connected to the output connection of the rotary transformer 6 of magnetic head K1 and the input of switch 63 to the output connection 9 of the rotary transformer 7. The outputs of switches 62 and 63 are connected to the input 59 of the video-signal processing circuit 58. Switch 62 can be controlled with a pulse-type control signal I7 emitted by the control-signal generator 41 at its control output 50, the control signal I7 ensuring that switch 62 is always conducting when the magnetic head K1 reproduces a video signal $S_V$ from the relevant sections of the tracks. Switch 63 can be controlled with a pulse-type control signal I8 emitted by the control-signal generator 41 at its control output 51, the control signal I8 ensuring that switch 63 is always conducting when magnetic head K2 reproduces a video signal $S_V$ from the relevant sections of the tracks. The video-signal processing circuit filters the reproduced video signals $S_V$ from the reproduced signal mixture of video signals $S_V$ and track-following signals with the frequencies $f_1$, $f_2$, $f_3$ and $f_4$ applied to it via the fourth switching device and converts them by means of suitable frequency demodulation of frequency conversion into video signals $S_V'$ which can be reproduced with a television receiver.

In view of the fact that the magnetic heads are always guided precisely along the tracks to be scanned by them in both the first and the second scanning intervals, which is achieved in the second scanning intervals by the time-division multiplex generation, in accordance with the invention, of the adjustment signals in a surprisingly simple manner, a flawless and distortion-free reproduction of the audio and video signal stored in the tracks is always ensured.

A number of variations are, of course, possible within the framework of the invention. For example, the drum-shaped scanning device can have more than two magnetic heads e.g. four situated at equal angular distances from each other, of which two adjacent magnetic heads are simultaneously in scanning contact with the magnetic tape in the second scanning intervals and the adjustment signals for the adjustment devices carrying these two magnetic heads are generated in time-division multiplex form in the second scanning intervals. The adjustment-signal generating circuit or the part of it for the generation of the signals corresponding to the adjustment signals from the signals reproduced by the magnetic heads can have the design published in DE-OS No. 32 17 031 or another design.

What is claimed is:

1. A system for the reproduction of signals stored on parallel tracks adjacent to one another and running diagonally to the longitudinal axis of the magnetic tape on which they are stored, with a drum-shaped scanning device round whose outer surface the magnetic tape is wound spirally within a predetermined angular range and which, for the purpose of scanning the tracks successively and reproducing the signals stored on them, comprises at least two magnetic heads which can be driven with a rotary movement, of which magnetic heads only one is at any time in scanning contact with the magnetic tape in cyclically successive first scanning intervals and both of whch are simultaneously in scanning contact with the magnetic tape in second scanning intervals and which are mounted on electromechanical adjustment devices with which, for their guidance over the tracks to be scanned, the magnetic heads are adjustable transversely in relation to the tracks in response to adjustment signals applied to the adjustment devices, for the generation of which signals an adjustment-signal generating circuit is provided, to which circuit, via a first switching device controlled by a control-signal generator, the signals reproduced by the magnetic heads and containing a measurement of the deviations of the magnetic heads from the track are to be applied alternately for the purpose of generating signals corresponding to the adjustment signals for the adjustment devices and which circuit incorporates the storage circuits connected at the inputs to the adjustment devices, to which storage circuits, via a second switching device controlled by the control-signal generator in a similar manner to the first switching device, the signals corresponding to the adjustment signals can be led alternately and which keep these signals for generation of the adjustment signals stored, the control-signal generator activating in the first scanning intervals the first switching device so as to pass th signals reproduced by the particular magnetic head in scanning contact on to the adjustment-signal generating circuit, and the second switching device so as to pass the signals corresponding to the adjustment signals for the adjustment device carrying the particular magnetic head in scanning contact on to th storage circuit connected at the input to this adjustment circuit, IN WHICH, during the second scanning intervals, the control-signal generator activates the first and second switching devices so as to pass at least once on an alternate time-division multiplex basis the signals reproduced by the two magnetic heads simultaneously in scanning contact on to the adjustment-signal generating circuit and the signals corresponding to the adjustment signals for the adjustment devices carrying the two magnetic heads simultaneously in scanning contact on to the storage circuits connected at the inputs to these adjustment devices.

2. A system as claimed in claim 1, in which the second switching device activated by the control-signal generator is formed by signal-scanning switches of scanning and holding circuits containing the storage circuits connected at the inputs to the adjustment devices.

* * * * *